United States Patent Office 3,448,036
Patented June 3, 1969

3,448,036
CONTINUOUS, LOW PRESSURE CATALYTIC RE-
FORMING PROCESS WITH SULFUR AND HALO-
GEN INCLUSION AND WATER EXCLUSION
John C. Hayes, Palatine, Ill., assignor to Universal Oil
Products Company, Des Plaines, Ill., a corporation of
Delaware
No Drawing. Continuation-in-part of application Ser. No.
560,903, June 27, 1966. This application July 26, 1968,
Ser. No. 747,802
Int. Cl. C10g 35/08
U.S. Cl. 208—139                                    6 Claims

ABSTRACT OF THE DISCLOSURE

A hydrocarbon charge stock boiling in the gasoline range is continuously reformed by contacting, in a substantially water-free reforming zone, the hydrocarbon charge stock, hydrogen, sulfur or a sulfur-containing compound, and halogen or a halogen-containing compound with a reforming catalyst containing a platinum group component at reforming conditions including a pressure of about 50 to 350 p.s.i.g. The sulfur or sulfur-containing compond and the halogen or halogen-containing compound is continuously introduced into the reforming zone, both during start-up and thereafter, in amounts calculated on an elemental basis, respectively equivalent to about 300 to about 3000 wt. p.p.m. of the hydrocarbon charge stock for sulfur and to about 1 to 25 p.p.m. of the hydrocarbon charge stock for the halogen. Furthermore, the amount of sulfur or sulfur-containing compound introduced into the reforming zone is not increased after start-up of the process. Key feature of the resulting improved process is the ability to continuously operate under this low pressure condition in a stable fashion for a catalyst life substantially greater than 15 barrels of charge per pound of catalyst without catalyst regeneration.

Cross-references to related applications

This application is a continuation-in-part of my application Ser. No. 560,903, filed June 27, 1966, now abandoned.

DISCLOSURE

The subject of the present invention is an improvement in a low pressure process for the continuous, catalytic reforming of hydrocarbon charge stocks boiling essentially within the gasoline range. More precisely, the present invention relates to the use of simultaneous sulfur and halogen addition to a continuous low pressure catalytic reforming process coupled with the substantial exclusion of water from this process, thereby enabling a substantial improvement in stability of the resulting process with corresponding increase in catalyst life before regeneration.

The conception of the present invention was facilitated by a number of recent developments associated with the field of low pressure, continuous reforming. In my prior application, I disclosed how the environment associated with conventional continuous reforming operations using a platinum-containing catalyst could be modified and controlled in such a fashion that an undesired series of degradation reactions could be substantially inhibited with corresponding increase in the efficiency, effectiveness, and stability of the reforming process. This development was based on a finding that the inclusion of sulfur and exclusion of water from a continuous catalytic reforming process enables the performance of the process to be substantially improved—particularly, in regard to the stability of the catalyst and the catalyst life before regeneration. Now I have additionally found that a continuous, low pressure, catalytic reforming process using sulfur inclusion and water exclusion can be significantly further improved by the continuous addition of a halogen or a halogen-containing compound thereto. In essence, then, the present invention involves the control of the concentration of sulfur, halogen, and water in a continuous, low pressure, catalytic reforming process in order to minimize the adverse effects of catalyst-degrading side reaction, thereby enabling a substantial increase in $C_5+$ yield coupled with increased process stability.

It is well known in the art that the requirements for an optimum process for transforming low octane stocks into high octane stocks, at minimum loss to undesirable products, involves a specially tailored catalytic environment that is designed to promote upgrading reactions for paraffins and naphthenes, which are the components of gasolines and naphthas that have the highest octane-improving potential. For paraffins the upgrading reactions are: isomerization to more highly branched paraffins, dehydrogenation to olefins, dehydrocyclization to aromatics, and hydrocracking to lower molecular weight paraffins. Of these, the dehydrocyclization reaction is the one that shows the maximum gain in octane number and is, consequently, preferred. For naphthenes, the principal upgrading reactions involve dehydrogenation to aromatics and ring isomerization and dehydrogenation to aromatics; but, the change in octane number is not as dramatic here as in the case of dehydrocyclization of paraffins since the clear research octane number of most naphthenes is in the range of 65 to 80. Accordingly, catalytic reforming operations are designed to provide an optimum mix between the aforementioned reactions, generally employing for this purpose a multi-purpose catalytic composite having at least a metallic dehydrogenation component and an acid-acting component.

It is not, however, to be assumed that the achievement and control of this optimum mix of upgrading reactions is without its problem areas. These, as is true with any complex set of reaction mechanisms, are injected into the picture by the uncontrollable side phenomena that are produced by a myriad of factors that color and complicate the actual operations of such a reforming process. Foremost among these complicating factors are those associated with undesired side reactions. Examples of these side reactions are: demethylation of hydrocarbons to produce methane, ring opening of naphthenes to give straight chain hydrocarbons, excessive hydrocracking of paraffins to yield light gases (i.e., $C_1$ to $C_4$), condensation of aromatics and other components to form carbonaceous deposits on the catalyst, acid-catalyzed polymerization of olefins and other highly reactive components to yield high molecular weight reactants that can undergo further dehydrogenation and thus contribute to the carbonaceous deposits on the catalyst, etc.

A successful reforming operation, therefore, minimizes the effects of these complicating factors by judicious selection of the catalytic environment and process variables for the particular charge stock of interest. But, adding an additional dimension of complexity to the solution of this problem is the interdependence of the set of desired reactions and the set of undesired reactions such that selection of the proper conditions to minimize undesired reactions has a marked effect on the set of desired reactions.

Nowhere is this interdependence more evident than in a "continuous reforming process." By "continuous reforming process," it is meant a reforming process that is operated for a catalyst life of at least 15 barrels of charge per pound of catalyst (b.p.p.) without regeneration. As is well recognized in the art, continuous reforming processes are sharply distinguishable from "regenerative"

reforming processes because in the latter type of process at least a portion of the catalyst is continuously being regenerated and the catalyst life before regeneration is always substantially less than 1 b.p.p. In regenerative reforming, stability is not a problem because of the continuous regeneration capability and the dominating objective in this type of reforming process is selectivity at octane. Because regenerative reforming systems are not directly concerned with minimizing the side reactions that lead to catalyst instability, it is to be understood that the concept of the present invention has no relationship to regenerative reforming. Similarly, the art on regenerative reforming since it is directed at the solution of a different problem has little relevance to continuous reforming systems where the dominating problem is the stability problem. Indeed, it is but a truism to observe that if a regenerative reforming process could be operated in a stable fashion it would cease to require continuous regeneration capability. Hence, the concept of the present invention relates exclusively to continuous reforming systems because in this system it is necessary to suppress undesired side reactions that lead to catalyst deactivation in order to maintain catalyst activity at a high level for a catalyst life of at least 15 b.p.p.

Because regenerative reforming systems need not be concerned about stability, the universal practice has been to run them at low pressure because of well-known short term yield advantages. The term "low pressure" as used herein means about 50 to about 350 p.s.i.g. For some time now, there has been a substantial need for a continuous reforming process that can operate at low pressure without sacrificing either stability or selectivity and I have found such a process as described in my prior application.

At this point, it is to be carefully noted that a low pressure, continuous reforming process is desired because the two main upgrading reactions mentioned previously—dehydrocyclization of paraffins and dehydrogenation of naphthenes—are net producers of hydrogen and as such they are favored by low system pressure.

The principal barrier to low pressure operation in the past has been the effect of low pressure on the previously mentioned catalyst-fouling reactions of condensation and polymerization which are believed to be the principal reactions involved in carbon or coke formation on the catalyst. It is thought that this carbon formation involves in part certain olefinic and aromatic hydrocarbons which appear to be adsorbed on the surface of the reforming catalyst, particularly at the dehydrogenation and aromatization sites, and that these catalytically active sites are thereby shielded from the materials being processed. Moreover, aromatics and olefinic materials in the presence of a reforming catalyst tend to undergo dehydrogenation, condensation and polymerization type reactions and to settle on the catalyst and undergo further dehydrogenation until carbonaceous deposits are formed. Low pressures tend to favor these catalyst fouling reactions because insufficient hydrogen is available to suppress these catalyst-fouling reactions which are generally characterized as hydrogen-producers. In addition, a low partial pressure of hydrogen, since it suppresses hydrocracking and hydrogenation tends to allow carbonaceous deposit precursors to collect on the catalyst, whereas ordinarily the high cracking activity and hydrogenation activity of the catalyst would tend to keep the catalyst relatively free of these carbonaceous deposit precursors. In any event, this increase in catalyst-fouling at low pressures results in the decline in catalyst aromatization activity and, if a product of constant quality is desired, it is necessary to compensate for this deactivation. Usually the most direct and inexpensive method for compensating, in a continuous reforming system, involves increasing the reaction temperature. This in turn, however, leads to the promotion of hydrocracking to a greater extent than dehydrogenation and dehydrocyclization reactions. Hence, greater losses to light gases are encountered and hydrogen consumption goes up and $C_5+$ yield goes down. Furthermore, the rate of catalyst fouling increases dramatically as temperature is increased. Accordingly, prior attempts at operating a continuous reforming process at low pressure have been unsuccessful because of this severe stability problem.

In my prior application, I have disclosed my finding that when a controlled quantity of sulfur is continuously introduced into a reforming catalyst environment which is maintained substantially free of water, the stability of a low pressure, continuous reforming process is extraordinarily improved. Now I have additionally found that the introduction of halogen or a halogen-containing compound to such a low pressure, continuous reforming process will effect a further significant improvement in process stability—particularly in regards to rate of temperature deactivation—with corresponding increase in catalyst life before regeneration.

It is, accordingly, an object of the present invention to provide an improvement in a continuous reforming process that operates with the continuous addition of sulfur thereto and the substantial exclusion of water therefrom. A related object is to increase the stability of such a process with corresponding increase in catalyst life before regeneration.

In a broad embodiment, the present invention consists of an improvement in a catalytic, low pressure process for continuously reforming a hydrocarbon charge stock boiling in the gasoline range for a catalyst life of at least 15 barrels of charge per pound of catalyst without catalyst regeneration. In this process, the hydrocarbon charge stock, hydrogen and sulfur or a sulfur-containing compound are continuously contacted, in a substantially water-free reforming zone, with a reforming catalyst containing a platinum group component at reforming conditions including a pressure of about 50 to about 350 p.s.i.g. Moreover, the sulfur or sulfur-containing compound is continuously introduced into the reforming zone, both during the start-up of the process and thereafter, in an amount calculated as elemental sulfur equivalent to about 300 to about 3000 wt. p.p.m. of the charge stock. Also the amount of sulfur or sulfur-containing compounds introduced into the reforming zone is not increased after start-up of the process. In this process, my improvement comprises continuously introducing a halogen or a halogen-containing compound into the reforming zone in an amount, calculated as elemental halogen, equivalent to about 1 to about 25 wt. p.p.m. of the charge stock, thereby substantially increasing the stability of the remaining process.

In another embodiment, the present invention encompasses the improved process as outlined above wherein the halogen-containing compound is an alkyl chloride which is introduced in an amount of about 1 to about 5 wt. p.p.m. of the charge stock.

Specific objects and embodiments of the present invention relate to details concerning process conditions used therein, particularly preferred catalysts for use therein, types of charge stock that can be reformed thereby, and mechanics of the reforming step and product recovery steps associated therewith, etc. These specific objects and embodiments will become evident from the following detailed explanation of the essential elements of the present invention.

Before considering in detail the various ramifications of the present invention, it is convenient to define several of the terms and phrases used in the specification and the claims. The phrase "gasoline boiling range" as used herein refers to a temperature range having an upper limit of about 400° F. to about 425° F. The term "naphtha" refers to a selected fraction of a gasoline boiling range distillate and will generally have an initial boiling point of from about 150° F. to about 250° F. and an end boiling point within the range of about 350° F. to about 450° F. The phrase "hydrocarbon charge stock" is intended to refer to a portion of a petroleum crude oil, a mixture of hydrocarbons, of a coal tar distillate, of a shale oil, etc., that boils within a given temperature range. The expressions "sulfur entering the reforming zone" or "halogen entering the reforming zone" are to be construed to mean the total quantity of equivalent sulfur or halogen entering the reforming zone from any source as elemental sulfur or halogen or in sulfur-containing or halogen-containing compounds. The amounts of sulfur and halogen given herein are calculated as weight parts of equivalent sulfur or halogen per million weight parts of charge stock (p.p.m.), and are reported on the basis of the elemental sulfur or halogen even though the sulfur or halogen is present as a compound. The phrase "substantially water-free" refers to the situation where the total water and water-producing compounds entering the reforming zone from any source is at least less than 10 p.p.m. by weight of equivalent water based on the hydrocarbon charge stock. The term "selectivity" when it is applied to a reforming process refers to the ability of the process to make hydrogen and $C_5+$ yield and to inhibit $C_1$–$C_4$ yield. The term "activity" when it is applied to reforming processes refers to the ability of the process, at a specified severity level, to produce a $C_5+$ product of the required quality as measured by octane number. The term "stability" when it is applied to the reforming process refers to the rate of change with time of the operation parameters associated with the process; for instance, a common measure of stability is the rate of change of reactor temperature that is required to maintain a constant octane number in output $C_5+$ product—the smaller slope implying the more stable process. The "liquid hourly space velocity" (LHSV) is defined to be the equivalent liquid volume of the charge stock flowing through the bed of catalyst per hour divided by the volume of the reforming zone containing catalyst.

The hydrocarbon charge stock that is reformed in accordance with the process of the present invention is generally a hydrocarbon fraction containing naphthenes and paraffins. The preferred charge stocks are those consisting essentially of naphthenes and paraffins although in some cases aromatics and/or olefins may also be present. This preferred class includes straight run gasolines, natural gaolines, synthetic gasolines, and the like. On the other hand, it is frequently advantageous to charge thermally or catalytically cracked gasolines or higher boiling fractions thereof. Mixtures of straight run and cracked gasoline can also be used. The gasoline charge stock may be a full boiling range gasoline having an initial boiling point of from about 50° F. to about 100° F. and an end boiling point within the range of from about 325 to 425° F., or may be a selected fraction thereof which usually will be a higher boiling fraction commonly referred to as a heavy naphtha. It is also within the scope of the present invention to charge pure hydrocarbons or mixtures of hydrocarbons, usually paraffins or naphthenes, which it is desired to convert to aromatics.

The charge stock must be carefully controlled in the areas of concentration of sulfur-containing compounds and of concentration of oxygen-containing compounds. In general, it is preferred that the concentration of both of these constituents be reduced to very low levels (that is, less than 10 p.p.m. calculated as water or sulfur respectively) by any suitable pretreating method such as a mild hydrogenation treatment with a suitable supported catalyst such as a cobalt and/or molybdenum catalyst. This is not to be construed to exclude the possibility that the concentration of sulfur-containing compounds in the charge stock could be carefully adjusted in order to furnish the required amount of sulfur to the reaction environment; but this latter method is difficult to control and is, consequently, not preferred. In any event, it is necessary that the total concentration of water and of water-yielding compounds be reduced to at least 10 p.p.m. calculated as equivalent water and preferably substantially less than this.

In general, it is preferred to first reduce the sulfur and oxygen concentration of the feed to very low levels, and thereafter inject into the reforming zone a controlled amount of sulfur or sulfur-containing compound. Any reducible sulfur-containing compound, that does not contain oxygen, which is converted to hydrogen sulfide by reaction with hydrogen at the conditions in the reforming zone may be used. This class includes: aliphatic mercaptans such as ethyl mercaptan, propyl mercaptans, tertiaryl butyl mercaptan, etc.; aromatic mercaptans such as thiophenol and derivatives; cycloalkane mercaptans such as cyclohexyl mercaptan; aliphatic sulfides such as ethyl sulfide; aromatic sulfides such as phenyl sulfide; aliphatic disulfides such as tertiary butyl disulfide; aromatic disulfides such as phenyl disulfide; dithioacids; thioaldehydes; thioketones; heterocyclic sulfur compounds such as the thiophenes and thiophanes; etc. In addition, free sulfur or hydrogen sulfide may be used if desired. Usually, a mercaptan such as tertiary butyl mercaptan is the preferred additive for reasons of cost and convenience.

Regardless of which sulfur additive is used, it is clear that it may be added directly to the reforming zone independently of any input stream, or that it may be added to either the charge stock or the hydrogen stream or both of these. For example, one acceptable method would involve the addition of hydrogen sulfide to the hydrogen stream. However, the preferred procedure involves the admixture of the sulfur additive with the charge stock prior to its passage into the reforming zone.

The amount of sulfur entering the reforming zone at any given time is a function of residual sulfur in the charge stock, the amount of sulfur added to the charge stock, the amount of sulfur in the hydrogen stream, and the amount added directly to the zone. Regardless of the source of the sulfur entering the reforming zone, it is an essential feature of the present invention that the total from all sources must be continuously maintained in the range of about 300 p.p.m. to about 3,000 p.p.m. based on weight of charge stock entering the reforming zone, and preferably about 500 to 1,500 wt. p.p.m.

Furthermore, I have determined that it is essential that the sulfur be present during start-up of the process and that the sulfur be continuously introduced in the amount given above for the duration of the reforming run. More particularly, if the process is started-up and lined-out and then sulfur is added, the results will be negative. Likewise, if sulfur introduction is discontinued during the course of the run and then later reintroduced, the process will not recover—that is the sulfur effect is not reversible. In short, the continuous presence of sulfur in a low pressure, continuous reforming system is absolutely essential to prevent rapid and irreversible catalyst deactivation.

Another essential limitation associated with the use of sulfur is that the amount of sulfur entering the reforming zone must not be increased during the course of the run because I have observed that if this happens the catalyst will quickly deactivate and will not respond to a subsequent reduction in the amount of sulfur entering the reforming zone. Hence, it is an essential feature of the present invention that the amount of sulfur entering the reforming zone is lined-out during start-up at a value within the range previously given and thereafter never increased above this level.

As hereinbefore indicated, another essential feature of the present invention is the continuous addition of a halogen or halogen-containing compound to the reforming zone during the course of the process. This can be most easily accomplished by adding a halogen-containing compound to one of the feed streams to the reforming zone—either to the hydrocarbon charge stock or to the hydrogen or to both. Alternatively, the halogen-containing compound can be independently introduced into the reforming zone; however, the preferred method is to admix it with the hydrocarbon charge stock.

For purposes of the present invention, the halogens that are particularly preferred are chlorine and fluorine with best results being obtained with chlorine or chlorine-containing compounds. The only significant limitations on the class of halogens or halogen-containing compounds, other than hydrogen halide, that are suitable for use in the present invention is that they must be capable of reduction to the corresponding hydrogen halide under the conditions maintained in the reforming zone, and they must not contain any reducible oxygen. Examples of preferred halogen-containing compounds are: hydrogen chloride, hydrogen fluoride, ammonium chloride, carbon tetrachloride, trichloromethane, dichlorodifluoromethane, etc. Particularly preferred compounds are the alkyl halides, such as tertiary butyl chloride, isobutyl chloride, ethyl chloride, tertiary butyl fluoride, n-hexyl chloride, n-hexyl fluoride, n-propyl chloride, tertiary heptyl chloride, and the like compounds. Although in some cases, it may be desirable to directly utilize elemental chlorine or fluorine, this procedure is not recommended. Likewise, it is to be understood that the halogen that is continuously introduced into the reforming zone may or may not be the same as the halogen originally present in the reforming catalyst; however, I have found best results are obtained when the halogen introduced into the zone is the same as the halogen originally combined with the catalyst.

The amount of halogen to be added to the reforming zone is preferably about 1 to about 25 wt. p.p.m. of the charge stock calculated on an elemental halogen basis even though a halogen compound may be utilized. Furthermore, I have found best results when utilizing an alkyl chloride in amounts sufficient to provide about 1 to about 5 wt. p.p.m. of the hydrocarbon charge stock. In addition, in some cases it is beneficial to increase the amount of halogen entering the reforming zone during the course of the process run.

It is acknowledged that it is old in the art to add a halogen or a halogen-containing compound to a reforming process; however, this technique is taught for the purpose of replacing halogen that has been removed from the catalyst during the course of the process by the stripping effect of water present in the input streams to the reforming zone. It is an essential feature of the present invention that the reforming zone is operated in a substantially water-free condition, and therefore the principal reason taught in the art for adding the halogen compound no longer exists. Accordingly, it is quite surprising, as will be demonstrated in the examples, that the simultaneous addition of sulfur and halogen when coupled with water exclusion from the reforming zone effects a substantial improvement in process stability.

As hereinbefore indicated, the reforming catalyst utilized contains a platinum group component. Typically this component is combined with a suitable refractory inorganic oxide carrier material such as alumina, silica, zirconia, magnesia, boria, thoria, titania, strontia, etc., and mixtures of two or more including silica-alumina, alumina-boria, silica-alumina-zirconia, etc. It is understood that these refractory inorganic oxides may be manufactured by any suitable method including separate, successive, or coprecipitation methods of manufacture, or they may be naturally-occurring substances such as clays, or earths which may or may not be purified or activated with special treatment. The preferred carrier material comprises a porous, adsorptive, high surface area alumina support having a surface area of about 25 to 500 or more m.²/gm. Suitable alumina materials are the crystalline aluminas known as gamma-, eta-, and theta-alumina, with gamma-alumina giving best results. In addition, in some embodiments the preferred alumina carrier material may contain minor proportions of other well-known refractory inorganic oxides such as silica, zirconia, magnesia, etc. However, the preferred carrier material is substantially pure gamma-alumina. In fact, an especially preferred carrier material has an apparent bulk density of about 0.30 to about 0.70 gm./cc. and has surface area characteristics such that the average pore diameter is about 20 to about 300 Angstroms, the pore volume is about 0.10 to about 1.0 ml./gm. and the surface area is about 100 to about 500 m.²/gm. A preferred method for manufacturing this alumina carrier material is given in U.S. Patent No. 2,620,314.

Another typical constituent of the reforming catalyst is a halogen component. Although the precise form of the chemistry of the association of the halogen component with the aluminum carrier material is not entirely known, it is customary in the art to refer to the halogen component as being combined with the alumina or with the other ingredients of the catalyst. This combined halogen may be either fluorine, chlorine, iodine, bromine, or mixtures thereof. Of these, fluorine and chlorine are preferred for the purposes of the present invention. The halogen may be added to the alumina support in any suitable manner, either before, during, or after the addition of the other components. For example, the halogen may be added as an aqueous solution of an acid such as hydrogen fluoride, hydrogen chloride, hydrogen bromide, etc. In addition, the halogen or a portion thereof may be composited with the alumina during the impregnation of the latter with the platinum group component; for example, through the utilization of a mixture of chloroplatinic acid and hydrogen chloride. In another situation, the alumina hydrosol which is typically utilized to form the alumina carrier material may contribute at least a portion of the halogen component to the final composite. In any event, the halogen will be typically composited in such a manner as to result in a final composite containing about 0.1 to about 1.5 wt. per cent and preferably about 0.4 to about 1.0 wt. per cent of halogen calculated on an elemental basis.

As indicated above, the reforming catalyst must contain a platinum group component. Although the preferred catalyst contains platinum or a compound of platinum, it is intended to include other platinum group metals such as palladium, rhodium, ruthenium, etc. The platinum group metallic component, such as platinum may exist within the final catalytic composite as a compound such as an oxide, sulfide, halide, etc., or as an elemental state. Generally, the amount of the platinum group metallic component present in the final catalyst is small compared to the quantities of the other components combined therewith. In fact, the platinum group metallic component generally comprises about 0.01 to about 3 wt. percent of the final catalyst calculated on an elemental basis. Excellent results are obtained when the catalyst contains about 0.1 to about 2.0 wt. percent of the platinum group metal.

The platinum group component may be incorporated in the catalytic composite in any suitable manner such as coprecipitation or cogellation with the alumina support, ion-exchange with the alumina support and/or alumina hydrogel, or impregnation of the alumina support at any stage in its preparation either before, during, or after its calcination treatment. The preferred method of preparing the catalyst involves the utilization of water soluble compounds of the platinum group metals to impregnate the alumina support. Thus, the platinum group metal may be added to the alumina support by commingling the latter with an aqueous solution of chloroplatinic acid.

Following the platinum and halogen impregnation, the impregnated alumina carrier material is typically dried and subjected to a conventional high temperature calcination or oxidation technique to obtain an oxidized composite of a halogen component and a platinum group component with an alumina carrier material. Similarly, additional treatments such as reduction and/or presulfiding may be performed on the resulting oxidized composite if desired.

It is understood that the reforming catalyst may be manufactured in any suitable manner and that the precise method of manufacture is not considered to be a limiting feature of the present invention. Likewise, it is understood that the catalyst may be present in any desired shape, such as: spheres, pills, pellets, extrudates, powder, etc. Additional details on one preferred catalyst for the process of the present invention are given in U.S. Patent No. 2,479,109.

According to the present invention, the hydrocarbon charge stock, hydrogen, sulfur or a sulfur-containing compound, and halogen or a halogen-containing compound are continuously contacted in a substantially water-free reforming zone with a reforming catalyst containing a platinum group component at reforming conditions. This reforming step may be accomplished in a fixed bed system, a moving bed system, a fluidized system, or in a batch type operation; however, in view of the danger of the attrition losses of the valuable catalyst and of well known operation advantages, it is preferred to use a fixed bed system. In this system, a hydrogen-rich stream and the charge stock are preheated, by any suitable heating means, to the desired reaction temperature and then are passed in admixture with sulfur or a sulfur-containing compound and with a halogen or halogen-containing compound, into a reforming zone containing a fixed bed of the catalyst. It is, of course, understood that the reforming zone may be one or more separate reactors with suitable heating means therebetween to insure that the desired conversion temperature is maintained at the entrance to each reactor. It is also to be noted that the reactants are typically in vapor phase and may be contacted with the catalyst bed in either upward, downward, or radial flow fashion with the latter being preferred.

It is an essential feature of the present invention that the reforming zone is maintained substantially water-free. To achieve and maintain this condition, it is necessary to control the water initially present in the reforming zone and the water level present in the charge stock and the hydrogen stream which are charged to the reforming zone. It is essential that the equivalent water entering the reforming zone from all sources be held to a level less than that equal to 10 wt. p.p.m. In general, this can be accomplished by predrying the reforming zone with a suitable circulating dry gas such as dry hydrogen, and by continuously drying the charge stock with any suitable drying means known to the art such as a conventional solid adsorbent having a high selectivity for water, for instance, silica gel, activated alumina, calcium or sodium crystalline aluminosilicates, anhydrous calcium sulfate, high surface area sodium, and the like adsorbents. Similarly, the water content of the charge stock may be adjusted by suitable stripping operations in a fractionation column or like device. And in some cases a combination of adsorbent drying and distillation drying may be used advantageously to effect almost total removal of water from the charge stock. Additionally, it is preferred to continuously dry the hydrogen stream entering the hydrocarbon conversion zone down to a level of about 10 volume p.p.m. of water or less. This can be conveniently accomplished by contacting the hydrogen stream with any suitable adsorbent such as the ones mentioned above. The preferred drying means for both charge stock and the hydrogen stream is calcium aluminosilicate molecular sieves having a pore size of about 5 Angstroms.

Regardless of the details of the operation of the reforming step, an effluent stream is continuously withdrawn from the reforming zone, cooled in a conventional cooling means and typically passed to a separating zone wherein a hydrogen-rich vapor phase separates from a hydrocarbon-rich liquid phase. A hydrogen-rich stream is then withdrawn from the separating zone and a portion of it vented from the system in order to remove the next hydrogen production and to maintain pressure control. Typically another portion of this withdrawn hydrogen stream is recycled via compressing means to the reforming step. Similarly, the hydrocarbon-rich liquid phase is withdrawn and typically passed to a suitable fractionation zone wherein a $C_1$ to $C_4$ product is taken overhead and a $C_5+$ product recovered as bottoms.

It is within the scope of the present invention to operate with a once-through hydrogen stream, but the preferred procedure is to recycle a hydrogen stream recovered from the effluent stream as indicated above. In this last mode, the recycle hydrogen stream can be selectively treated to remove $H_2O$ without removing $H_2S$ by using a suitable selective adsorbent (e.g., see U.S. Patent No. 3,201,343); however, this procedure requires the calculation of the equilibrium level of sulfur that will enter the reforming zone with the hydrogen stream for a given sulfur input in the charge stock so that the total quantity of sulfur entering the reforming zone, in both the charge stock and hydrogen stream, is lined-out at a value in the range previously given. An alternative approach which is simpler to control is to remove substantially all $H_2O$ and $H_2S$ from the recycle hydrogen stream and control the amount of sulfur entering the reforming zone exclusively by the amount admixed with the charge stock.

As indicated previously, a singular feature of the process of the present invention is the capability to operate in a stable fashion at low pressure. In the past, it has been the practice to operate at high pressure primarily to provide sufficient hydrogen to saturate hydrocarbon fragments generated during the reforming process and to prevent excessive carbon deposition on the catalyst with the attendant decline in the catalyst's activity for the upgrading reactions of interest. I have now found that a stable operation is achieved using the catalyst and process of the present invention at pressures in the range of about 50 to about 350 p.s.i.g. and preferably about 75 to about 300 p.s.i. The exact selection of the operating pressure within these ranges is made primarily as a function of the characteristics of the particular charge stock and catalyst used in the process.

The temperature required in the reforming zone is generally lower than that required for a similar high pressure operation. This significant and desired feature is a consequence of the inherent selectivity of the low-pressure operation for the octane-upgrading reactions as previously explained. In the past, when high-octane was required, it was the practice to run at high temperatures in order to produce more hydrocracking of paraffins and thus concentrate the available aromatics in the product stream. The present process requires a temperature in the range of about 800° F. to about 1100° F. and preferably about 850° F. to about 1050° F.

The process is operated at a liquid hourly space velocity in the range of about 0.5 to about 15.0 $hr.^{-1}$ and preferably in the range of about 1.0 to about 5.0 $hr.^{-1}$. Furthermore, the amount of hydrogen-rich gas charged along with the hydrocarbon stream is from about 0.5 to about 20 moles of hydrogen per mole of hydrocarbon, and preferably from about 4 to about 12 moles of hydrogen per mole of hydrocarbon.

An extraordinary feature of the process of the present invention is the infrequency with which the catalyst must be regenerated. Previously, low pressure operations have required extensive regenerating facilities if the associated catalyst is to be used for an economic period of time. The process of the present invention, since it operates for at least a catalyst life of 15 b.p.p. and more typically, 25 b.p.p. to 100 b.p.p., without any regeneration can be built without extensive regenerating facilities, such as swing bed reactors, thereby effecting great savings in initial investment. For example, for a typical reforming catalyst having an apparent bulk density of about 32 lb./cu. ft., the improved process of the present invention would operate, for a minimum catalyst life of at least 15 b.p.p., which at a typical LHSV of 1 $hr.^{-1}$ corresponds to 3.7 months before any regeneration of the catalyst would be required;

and depending on the charge stock and severity level utilized, it would more typically operate for a catalyst life of about 25 b.p.p. to about 100 b.p.p. which at a LHSV of 1 hr.$^{-1}$ corresponds to a catalyst life of about 6.15 months to about 24.6 months without any regeneration of the catalyst. An additional incentive for avoiding frequent regeneration is the substantial danger of injecting small amounts of water into the system from the regeneration operation via inefficient purging techniques once the oxidation step of the regeneration cycle is completed. As previously discussed, the presence of even small quantities of water in the system can jeopardize the stability of the process; accordingly, stringent precaution must be taken to insure that the reforming zone is substantially free from water after its infrequent regeneration operations are performed.

The following examples are given to illustrate further the process of the present invention and to indicate the benefits to be afforded through the utilization thereof. It is understood that the examples are given for the sole purpose of illustration, and are not considered to limit unduly the generally broad scope and spirit of the claims.

Example I

This example shows the beneficial effect of the simultaneous addition of chloride and sulfur in a low pressure, continuous reforming process operated substantially water-free.

A catalyst was prepared utilizing 1/16 inch alumina spheres, manufactured in accordance with U.S. Patent No. 2,620,314. The spheres were then impregnated with an aqueous solution of chloroplatinic acid and hydrogen chloride. The impregnated spheres were then dried and thereafter subjected to high temperature oxidation. The catalytic composite was then subjected to a high temperature reduction treatment in an atmosphere of hydrogen. This reduction treatment was followed by a high temperature sulfiding treatment with hydrogen sulfide. The resultant catalytic composite contained 0.75% by weight of platinum, 0.90% by weight of chloride, and about 0.10% by weight of sulfur, all calculated on an elemental basis.

The charge stock for this example was a light Kuwait naphtha having the properties shown in Table I.

TABLE I.—LIGHT KUWAIT NAPHTHA

| | |
|---|---|
| Gravity, °API @ 60° F. | 65.0 |
| 100 ml. ASTM distillation: | |
| Initial boiling point ° F | 180 |
| 5% ° F | 194 |
| 10% ° F | 198 |
| 30% ° F | 206 |
| 50% ° F | 214 |
| 70% ° F | 224 |
| 90% ° F | 243 |
| 95% ° F | 255 |
| End boiling point ° F | 304 |
| Sulfur, parts per million (p.p.m.) | 1.6 |
| Nitrogen (p.p.m.) | 0.79 |
| Water (p.p.m.) | <2 |
| Octane number, F-1 clear | 50.4 |
| Octane number, F-1+3 cc. Tel | 73.8 |
| Volume percent paraffins | 76.0 |
| Volume percent naphthenes | 18.0 |
| Volume percent aromatics | 6.0 |

Two separate portions of the charge stock were then subjected to an accelerated activity-stability test which comprised: passing the stock over a fresh load of 100 cc. of the aforementioned catalyst at a pressure of 100 p.s.i.g., a LHSV of 1.5 hr.$^{-1}$ and a mole ratio of 10 moles of total recycle gas per mole of hydrocarbon charge. The test period was six days. The target octane was 100 F–1 clear and the conversion temperature was adjusted constantly during the tests to meet this output requirement.

The tests were conducted in a reforming plant comprising a single reforming zone, a separating zone, and a debutanizer column. The effluent from the reforming zone was cooled and passed to the separating zone maintained at the same pressure as in the reforming zone but at a temperature of about 55° F. A portion of the hydrogen-rich vapor phase withdrawn from the separating zone was passed through a high surface area sodium scrubber and recycled to the reforming zone in order to supply the necessary hydrogen and to maintain pressure therein; the excess vapor phase from the separating zone was separately recovered as excess separator gas. The function of the scrubber was to remove substantially all $H_2O$ and $H_2S$ from the gas passed to it. The liquid phase from the separating zone was passed to a debutanizer column in which the light ends (i.e., hydrocarbons in the range of $C_1$ to $C_4$) were removed overhead. The $C_5+$ bottoms product from the debutanizer was separately recovered and analyzed.

For purposes of comparison, two separate runs were made. In the first, the control run, tertiary heptyl mercaptan was commingled with the charge stock in an amount sufficient to provide 600 wt. p.p.m. of sulfur. In view of the fact that the recycle gas was scrubbed substantially free of $H_2S$, the total amount of sulfur entering the reforming zone was continuously maintained at 600 wt. p.p.m. based on weight of the naphtha charge. Likewise, due to low water content of the naphtha coupled with the use of the recycle scrubber, the reforming zone was maintained substantially water-free—that is, substantially less than about 5 wt. p.p.m. based on the naphtha charge.

In the second run, performed in accordance with the present invention, tertiary heptyl mercaptan and tertiary butyl chloride are both added to the charge stock in amounts sufficient to provide 600 wt. p.p.m. of sulfur and 2 wt. p.p.m. of chloride. Accordingly, in this latter run the amount of sulfur and chloride continuously entering the reforming zone are maintained at 600 wt. p.p.m. and 2 wt. p.p.m., respectively, based on the charge stock with the reforming zone being maintained substantially water-free as in the first run.

Results of the two runs are shown in Table II.

TABLE II.—RESULTS OF HIGH STRESS COMPARISON TEST

| Run No. | T. (1),[1] °F. | T. (6),[1] °F. | ΔT., °F. | $C_5+(2)$,[2] vol. percent | $C_5+(6)$,[2] vol. percent | $\Delta C_5+$, vol. percent |
|---|---|---|---|---|---|---|
| 1 | 953.0 | 971.5 | +18.5 | 72.8 | 72.2 | −0.6 |
| 2 | 950.5 | 965 | +14.5 | 72.2 | 70.5 | −1.7 |

[1] Conversion temperature necessary to make octane requirement during 1st period and 6th period, respectively.
[2] $C_5+$ yield during 2d and 6th periods, respectively.

The duration of the test corresponded to a catalyst life of about 1 barrel of charge per pound of catalyst (b.p.p.) and on this basis, it can be seen that the principal effect of the chloride addition was to decrease the temperature in stability of the catalyst from +18.5° F./b.p.p. to 14.5° F./b.p.p. or an improvement of 4° F./b.p.p.

Example II

A desulfurized, straight-run naphtha having the properties shown in Table III was subjected to a pilot plant scale, stability test by continuously charging this stock to a reforming zone containing a catalyst comprising alumina, about 0.75 wt. percent platinum, about 0.90 wt. percent chloride, and about 0.10 wt. percent sulfur. The catalyst was manufactured according to the method given in Example I.

TABLE III.—ANALYSIS OF STRAIGHT-RUN NAPTHA

| | |
|---|---|
| Gravity, ° API at 60° F. | 56.1 |
| Engler distillation: | |
| IBP ° F. | 203 |
| 10% ° F. | 226 |
| 30% ° F. | 244 |
| 50% ° F. | 264 |
| 70% ° F. | 293 |
| 90% ° F. | 350 |
| EBP ° F. | 368 |
| Sulfur wt. p.p.m. | 0.1 |
| Water wt. p.p.m. | 2.5 |
| Paraffins vol. percent | 46 |
| Napthenes vol. percent | 48 |
| Aromatics vol. percent | 6 |
| Octane No., F-1 clear | 46.0 |

The flow scheme utilized was essentially the same as that described in Example I with the exceptions that the charge stock was dried with a high-surface area sodium scrubber and that the hydrogen recycle stream was dried with a 13X mole sieve drier that had been presaturated with hydrogen sulfide, according to the method given in U.S. Patent No. 3,201,343. In view of this presaturation, the drier had a high selectivity for water with relatively little capability for removing $H_2S$, and the concentration of $H_2S$ was allowed to build to an equilibrium level in this recycle hydrogen stream. Moreover, before this reforming plant was started-up, it was dried by circulating hot hydrogen gas through a molecular sieve drier at 400 p.s.i.g. Thus, the reforming zone was maintained substantially water-free.

Tertiary heptyl mercaptan was added to the naphtha charge stock in an amount of about 200 wt. p.p.m., calculated as equivalent sulfur, and for this plant, operated with recycle hydrogen in an amount sufficient to provide a hydrogen to hydrocarbon ratio of about 8:1, this is equivalent to a total sulfur input into the reforming zone of about 1000 wt. p.p.m., based on weight of naphtha charge because of the sulfur present in the hydrogen recycle stream. In addition, tertiary butyl chloride was added to the charge stock in an amount equivalent to 1.5 wt. p.p.m. of Cl.

The reforming process was conducted at the following conditions: a pressure of 200 p.s.i.g., a LHSV of 2.0 hr.$^{-1}$, and a hydrogen to hydrocarbon mole ratio of about 8:1. In addition, the reactor temperature was continuously adjusted in order to maintain the $C_5+$ output product at an octane number of 100 F-1 clear.

TABLE IV.—RESULTS OF PILOT PLANT STABILITY TESTS

| | Run 1, 200 p.p.m. S + No. Cl | | | Run 2, 200 p.p.m. S +1.5 p.p.m. Cl | | |
|---|---|---|---|---|---|---|
| Catalyst life, b.p.p. | 1.0 | 5.0 | Δ/b.p.p. | 1.0 | 5.0 | Δ/b.p.p. |
| $C_1 + C_2$, wt. percent | 4.3 | 6.3 | +0.50 | 3.2 | 5.0 | +0.45 |
| $C_3+C_4$, wt. percent | 5.8 | 7.8 | +0.05 | 5.2 | 7.2 | +0.50 |
| $C_5+$, vol. percent | 81.0 | 77.2 | −0.95 | 80.5 | 78.7 | −0.45 |
| Aromatics, vol. percent | 57.3 | 52.7 | −1.15 | 54.8 | 54.2 | −0.15 |
| $H_2$, s.c.f.b. | 1,540 | 1,340 | −50 | 1,530 | 1,410 | −30 |
| Conv. temp., ° F | 956 | 982 | +6.15 | 956 | 971 | +3.6 |

The process was run for a process period corresponding to a catalyst life of 5.0 b.p.p with the results shown in Table IV. It is understood that the run was terminated at this catalyst life not because the catalyst needed regeneration but because the stability data desired was obtained, and it was not necessary to tie up the plant for any longer period. In commercial practice, this run would have been allowed to continue for a catalyst life substantially greater than 15 b.p.p. In addition, Table IV shows the results of an identical run made with the same charge stock, catalyst, sulfur input, and conditions except that no chloride was added.

From an examination of Table IV, it can be concluded that the effect of the continuous addition of Cl was to sharply increase both the yield and temperature stability; namely, the $C_5+$ yield decline rate decreased from −0.95 vol. percent b.p.p. to −0.45 vol. percent b.p.p. and the temperature deactivation rate decreased from +6.15° F./b.p.p. to +3.6° F./b.p.p. Accordingly, the improvement of the present invention, in this case, decreased $C_5+$ yield decline rate by 53% and decreased temperature deactivation rate by 41.5%.

I claim as my invention:

1. In a catalytic, low pressure process for continuously reforming a hydrocarbon charge stock boiling in the gasoline range for a catalyst life of at least 15 barrels of charge per pound of catalyst without catalyst regeneration; wherein the hydrocarbon charge stock, hydrogen and sulfur or a sulfur-containing compound are continuously contacted in a substantially water-free reforming zone with a reforming catalyst containing a platinum group component at reforming conditions including a pressure of about 50 to about 350 p.s.i.g.; wherein the sulfur or sulfur-containing compound is continuously introduced into the reforming zone, both during the start-up of the process and thereafter, in an amount, calculated as elemental sulfur, equivalent to about 300 to about 3000 wt. p.p.m. of the charge stock; and wherein the amount of sulfur or sulfur-containing compound introduced into the reforming zone is not increased after start-up of the process, the improvement which comprises continuously introducing a halogen or a halogen-containing compound into the reforming zone in an amount, calculated as elemental halogen, equivalent to about 1 to about 25 wt. p.p.m. of the charge stock, thereby increasing the stability of the process.

2. The improved process of claim 1 wherein the halogen-containing compound enters the reforming zone in admixture with the hydrogen charge stock.

3. The improved process of claim 1 wherein the halogen-containing compound is an alkyl halide.

4. The improved process of claim 1 wherein said halogen-containing compound is a chlorine-containing compound.

5. The improved process of claim 4 wherein the chlorine-containing compound is an alkyl chloride which is introduced in an amount of about 1 to 5 wt. p.p.m. of the charge stock calculated on an elemental chlorine basis.

6. The improved process of claim 1 wherein the reforming conditions include a LHSV of about 0.5 to about 15.0 hr.$^{-1}$, a temperature of about 800 to about 1100° F., and a mole ratio of hydrogen to charge stock of about 0:5:1 to about 20:0:1.

References Cited

UNITED STATES PATENTS

| | | | |
|---|---|---|---|
| 2,642,384 | 6/1953 | Cox | 208—139 |
| 2,899,378 | 8/1959 | Herder | 208—139 |
| 2,902,426 | 9/1959 | Heinemann et al. | 208—139 |
| 2,911,358 | 11/1959 | Leigh et al. | 208—139 |
| 2,952,611 | 9/1960 | Hayton et al. | 208—65 |
| 3,006,841 | 10/1961 | Haensel | 208—139 |
| 3,067,130 | 12/1962 | Baldwin et al. | 208—138 |
| 3,201,343 | 8/1965 | Bicek | 208—138 |

HERBERT LEVINE, *Primary Examiner.*